United States Patent [19]
Liechti et al.

[11] Patent Number: 4,488,029
[45] Date of Patent: Dec. 11, 1984

[54] ELECTRO-EROSIVE PROCESSING APPARATUS

[75] Inventors: Niklaus Liechti; Rudolf Schneider, both of Reinach, Switzerland

[73] Assignee: Erowa AG, Reinach, Switzerland

[21] Appl. No.: 234,592

[22] Filed: Feb. 13, 1981

[30] Foreign Application Priority Data

Feb. 13, 1980 [CH] Switzerland ............ 1184/80

[51] Int. Cl.$^3$ .................................... B23P 1/08
[52] U.S. Cl. .......................... 219/69 C; 219/69 G
[58] Field of Search ............ 219/69 R, 69 C, 69 S, 219/69 G, 69 M, 68, 69 W

[56] References Cited
U.S. PATENT DOCUMENTS

| | | | |
|---|---|---|---|
| 3,849,624 | 11/1974 | Dulebohn et al. ............ | 219/69 G |
| 4,263,494 | 4/1981 | Martin ......................... | 219/69 C |
| 4,310,742 | 1/1982 | Pfau ............................. | 219/69 M |
| 4,314,133 | 2/1982 | Pfau et al. .................... | 219/69 M |

*Primary Examiner*—M. H. Paschall
*Attorney, Agent, or Firm*—Yount & Tarolli

[57] ABSTRACT

In electro-erosive machining apparatuses with multidimensional relative motion between a tool-electrode and a workpiece electrode, a simple and adaptable control is provided for these relative operating movements, with a superimposed shaping-limiting control and subordinated cyclic repetitive oblique erosion. In this connection, the tool-feed is limited, within individual oblique-erosion cycles, by achieving a predetermined shaping envelope-surface. The apparatus comprises two separate coordinating-function-transmitters by means of which two operating movements, at an angle to each other, are each determinable according to a resultant relative operating movement between the tool and the workpiece, one being used for shaping-limiting control and the other for oblique erosion. Initiation of the consecutive oblique-erosion cycles is effected by means of a repetition-circuit as a function of a rated-value/actual-value approximation of the shaping-limiting control.

4 Claims, 7 Drawing Figures

FIG. 5
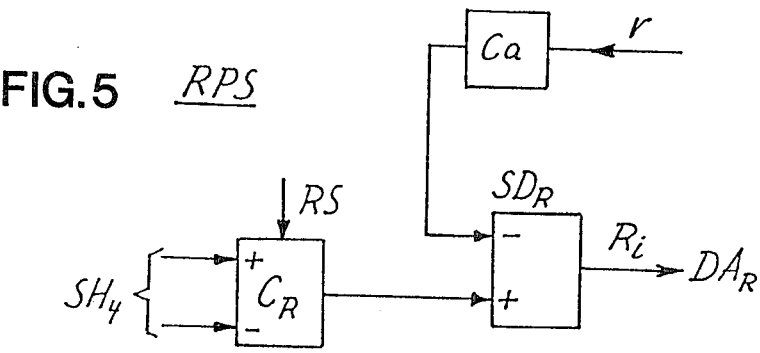
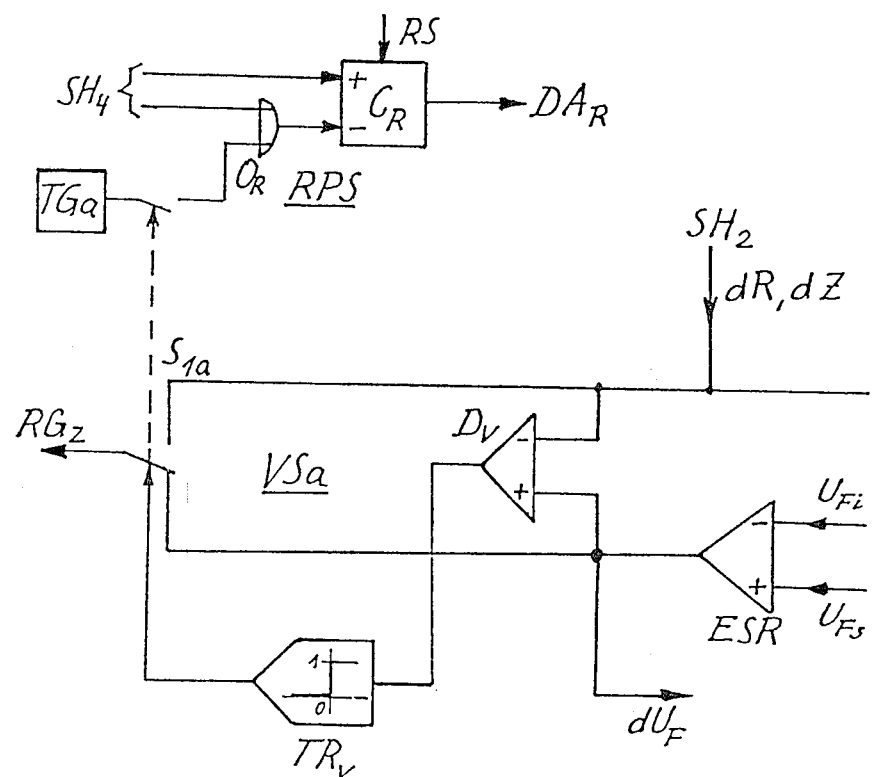
FIG. 6

ELECTRO-EROSIVE PROCESSING APPARATUS

BACKGROUND OF THE INVENTION

The invention relates to an electro-erosive machining apparatus of the sort comprising at least one tool electrode and one workpiece electrode which are arranged to move relative to each other in a first operating direction and in a second operating direction involving the performance of a translatory rotational motion in a plane transverse to the first operating direction, driving and controlling devices for moving the electrodes in the first and second directions and means coordinating the driving and controlling means for moving the electrodes so as to determine the shaping of multidimensional surfaces to be formed within the workpiece electrode.

An apparatus of this kind, in the form of a spark-eroding machine, is known from Swiss Pat. No. 596,940. This machine accomplishes a three-dimensional relative, operating movement of the tool-electrode (hereinafter "electrode") and of the workpiece-electrode (hereinafter "workpiece") in the form of a translatory rotational motion with variable radial deflection in a plane, and an axial displacement in a direction transverse to the plane which is a function of the radial deflection.

In the known machining apparatus, separate adjusting motors, with appropriate drive-controls and a superimposed control-system, are provided for the various axes of the spatial coordinates-system and the corresponding components of the relative operating movement between the electrode and the workpiece. This makes it possible to achieve generally cylindrical and conical surfaces as envelope-surfaces on the workpiece, in addition to three dimensional surfaces meeting certain conditions of symmetry, more paticularly spherical surfaces.

In the case of modern spark-erosion machining methods, however, there arises the problem of producing extensive workpiece surface envelopes or electrode-motion surface envelopes by a sequence of operating increments corresponding to an operating movement occurring on surfaces which are conical or sloping in relation to the main feed direction. Such a complex machining method in which the shaped surface represents the envelope-surface of the operating increments requires control functions for the feed along individual coordinate axes which cannot be obtained with the known apparatus. This also applies to specific, substantially two-dimensional operating movements requiring, instead of a continuous rotary motion, selective setting of specific angular positions within the rotary motion A complex method of operation of the type mentioned above also occurs in the case of operating movements which take place in a specific axial-radial plane, for example, when progressive operating increment steps are arranged in rows or are superimposed, for example, a comparatively small incremetal lift with an electrode feed at an angle to the axial and radial directions. Here again, the final shape of the surface is determined by the envelope or tangential surface of the electrode-surface-points in their maximal gap position.

SUMMARY OF THE INVENTION

It is therefore the purpose of the invention to provide an apparatus for the electro-erosive machining of workpieces, which is characterized by considerable adaptability of the sequence control of multi-dimensional operating and feed-movements consisting of conical and inclined incremental movements and various possible combinations thereof.

To this end an apparatus constructed according to the present invention comprises at least two separate coordinating function transmitters sequentially placed alternately in operative connection with the driving and controlling means respectively, and a shape-limiting control is provided for priority placing of one of the coordinating function transmitters in operative connection with the driving and controlling means.

The separate coordinating function transmitters provide for various oblique angles of erosion and axial-radial feed conditions, and make it possible, by utilizing the flexibility of a data-processing device, to establish optimal machining conditions for conical or oblique incremental movements as well as to achieve any desired envelope-shape with either a predetermined angle of obliquity or an angle which is variable and is a function of the progress of the machining process and of the axial feed of the electrode.

BRIEF DESCRIPTION OF THE DRAWINGS

Further features and advantages of the invention will become apparent from the following description of preferred embodiments in conjunction with the attached drawings wherein:

FIG. 5 is a fragmental block diagram showing a modification of the diagram of FIG. 2, for obtaining radial resetting for periodic oblique erosion;

FIG. 6 is block diagram for obtaining resetting in periodic oblique erosion, in conjunction with a modified circuit for superimposing the erosion-voltage control over the shaping control.

DESCRIPTION OF PREFERRED EMBODIMENTS

Figure 1:
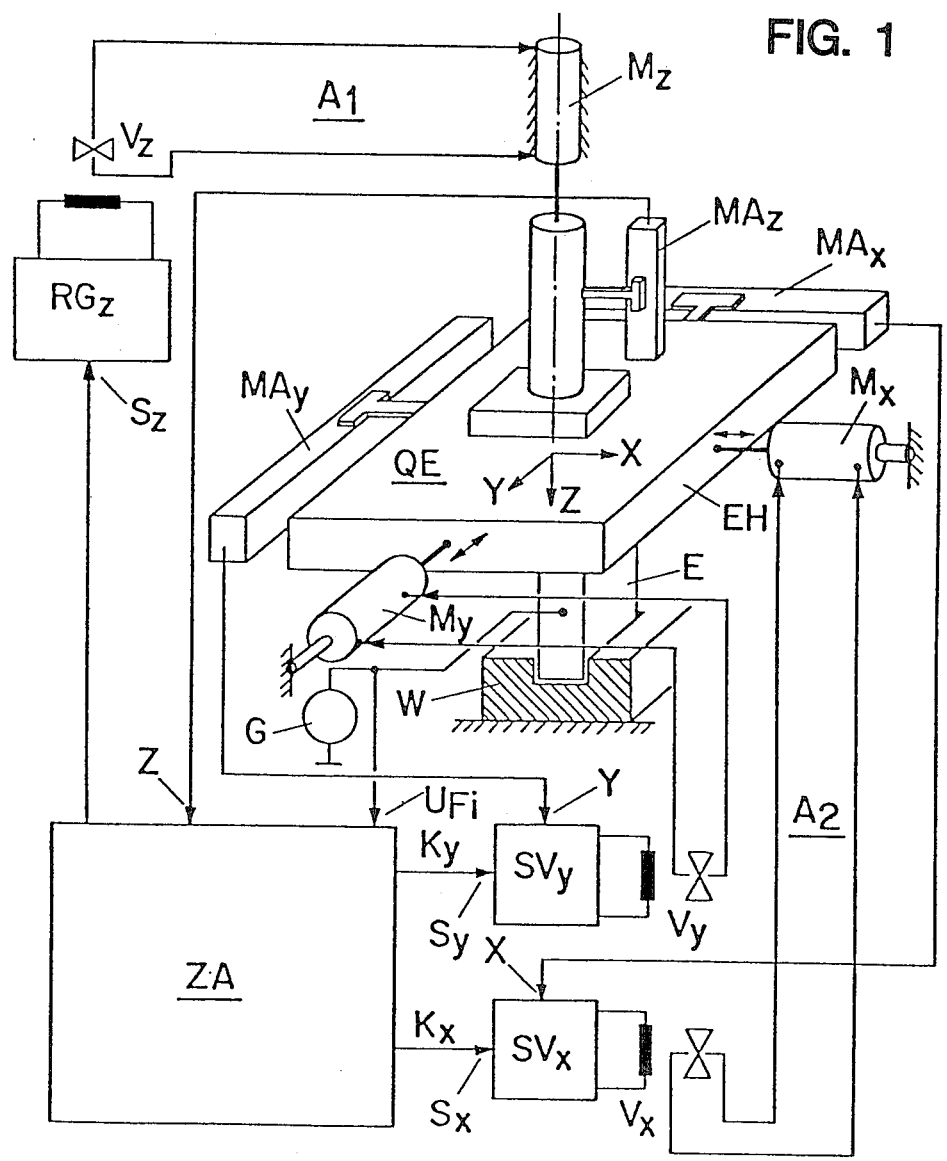
FIG. 1 is a schematic illustration of an erosion apparatus showing the drive, control and regulation units for three-dimensional operating and feeding movements of the electrode.

The apparatus of FIG. 1 comprises an electrode-holder EH adapted to move in three-dimensions along mutually perpendicular coordinates X, Y and Z. A first drive-unit $A_1$ is provided for the Z-axis and a second drive-unit $A_2$ is provided for the X and Y axes in a plane QE transverse to the Z axis.

The components of relative movement between electrode and workpiece in Z-direction are referred to as the "first operating movement", and those in the transverse plane QE as the "second operating movement".

A diagrammatically indicated electrode E is fed to a stationary workpiece W. A generator G delivers energy for an electric spark between the electrode E and the workpiece W. The spark-erosion voltage $U_{F_1}$ between the electrode and the workpiece defines the width of the erosion-gap and is a parameter applied to a control-circuit to be described hereinafter. The voltage $U_{F1}$ is fed to a common time-sequence control ZA which delivers through control-channels $K_x$ and $K_y$, position-control signals $S_x$ and $S_y$, as reference values, to comparators $Sv_x$ and $Sv_y$ of an X- and Y-auxiliary control-circuit for the second drive-unit $A_2$. X- and Y-signals representing actual values are also fed to comparators $Sv_x$ and $Sv_y$ which produce in a conventional manner reference value/actual-value difference signals and adjustment-factor signals for controlling servo-valves $V_x$ and $V_y$ which control linear adjusting motors $M_x$ and $M_y$. The Z-signal is similarly fed to time sequence control AZ which delivers a position control signal $S_z$ for the drive unit A1. The X-, Y- and Z-signals are generated by displacement sensors $MA_x$, $MA_y$, $MA_z$ operatively connected to electrode-holder EH. The Z adjusting motor $M_z$ is controlled by time-sequence control AZ through a servo-valve $V_z$ preceded by a regulator $RG_z$ which is the output element of an associated control-circuit.

Under the influence of time-sequence control ZA, adjusting motors $M_x$ and $M_y$ carry out oscillating movements corresponding to the time-sequence of control signals $S_x$ and $S_y$. In the case of a circular path of movement, this time-sequence is sinusoidal, and oscillation periods of the signal undergo a cyclic displacement corresponding to the spatial angle of 90° between the X- and Y-components of movement. With suitable guidance of the electrode holder EH to prevent twisting in transverse plane QE, a circular, translatory, rotary motion is obtained as the second operating movement.

Figure 2A:
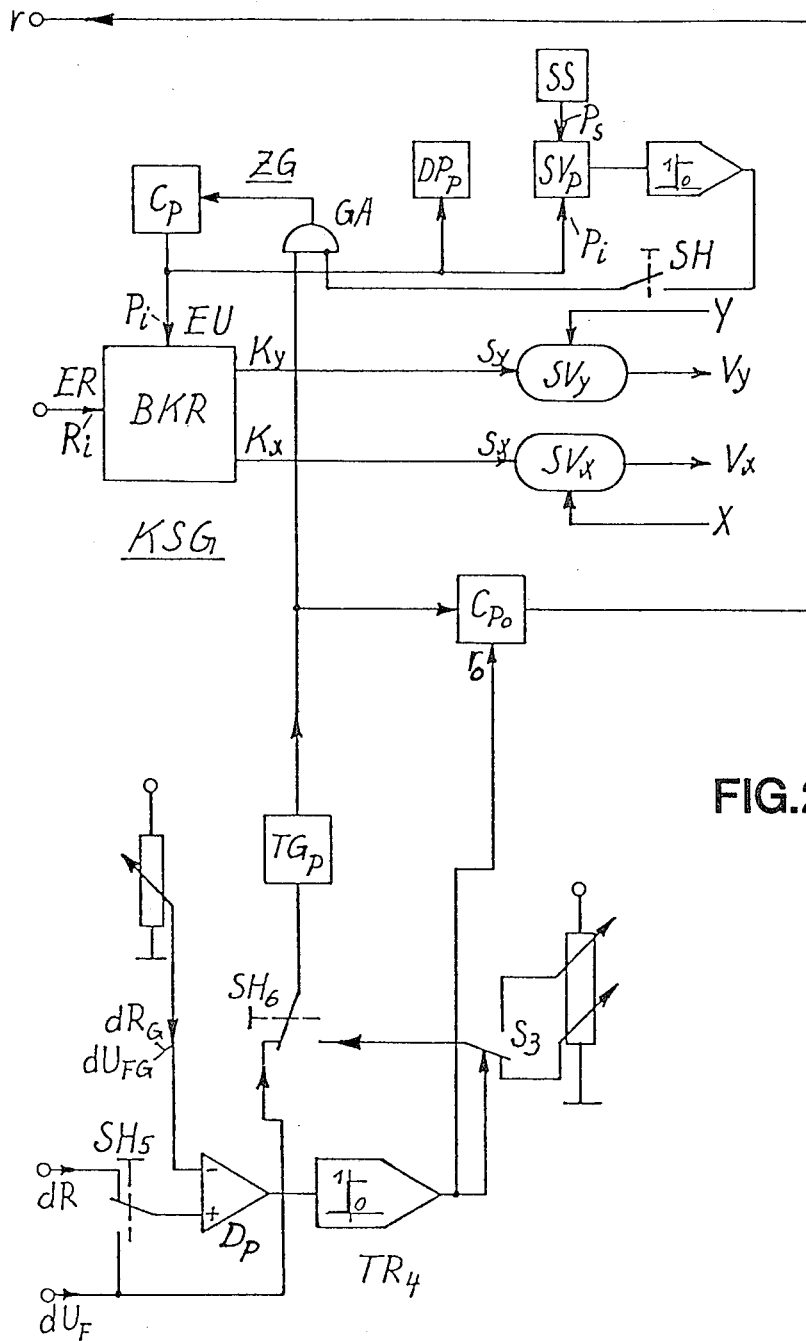
FIGS. 2a and 2b are block diagrams of the time sequence control for the operating movements of the apparatus shown in FIG. 1.
Figure 2B:
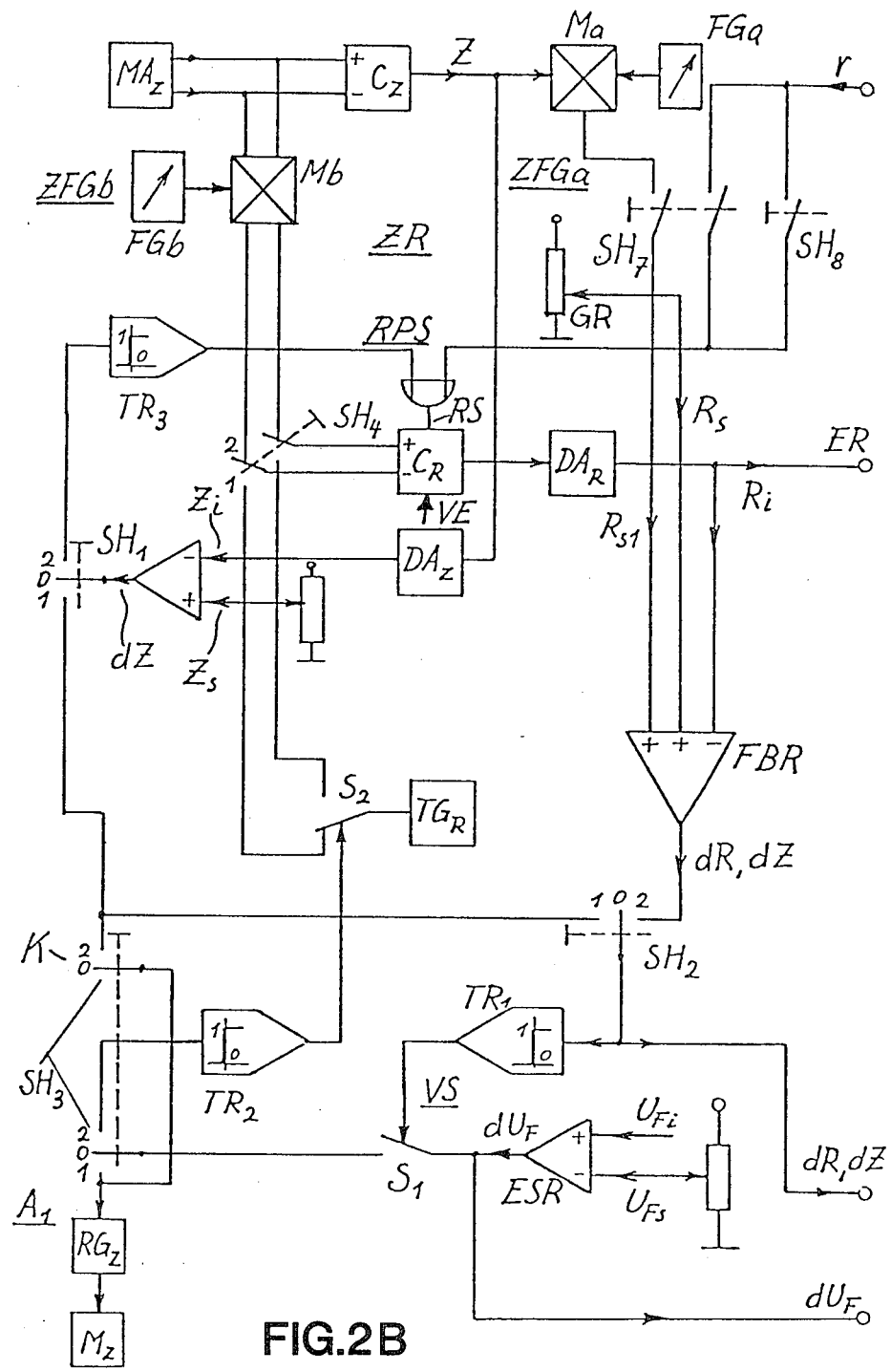

For second operating movements in a specific radial direction, the angle of rotation within the plane EQ may be set to a perdetermined value. Arranged within time-sequence control ZA, illustrated in FIGS. 2a and 2b, is an orbital control-signal generator KSG with a path-of-movement computer BKR, comprising a radius-control-input ER and an angle-of- rotation-control input EU, and output control-channels $K_x$ and $K_y$ delivering control-signals $S_x$ and $S_y$ the phases of which are displaced at 90° in relation to each other. The absolute phase-position, and thus the instantaneous value of the angle of rotation, is determined as an actual value $P_i$ by a timer ZG and is continuously advanced during operation. To this end the timer comprises a pulse-generator $TG_{pz}$ followed by a counter $C_p$ which forms the actual-value signal $P_i$ for control input EU. This signal is passed to an indicating device $DP_p$ and to a reference-value/actual-value comparator $SV_p$, to which an angle of rotation reference value is applied by a manually reference value adjuster SS having an indicating device. When the manual switch SH is closed, the comparator $SV_p$ halts the advance of the angle of rotation by causing blocking AND-gate GA to change state when the reference value is reached. This makes it possible to set statically any desired angle of rotation, for example, as the starting point for a machining operation or for machining in a selected vertical plane.

The shown time-sequence control ZA makes it possible to provide a feed-control both in the radial direction parallel with the plane QE and in the Z-direction, either alone or in mutual dependency. In any case, it is superimposed on an erosion-gap control as a function of a reference value/actual-value comparison of the erosion-spark voltage.

For Z-control only, manual switches $SH_1$, $SH_2$ and $SH_3$ are set in position 1, and a counter $C_z$, controlled by Z-displacement sensor $MA_z$ having an incremental action, delivers, through a digital-analog transducer $DA_z$, an actual-value signal $Z_1$ for comparison with a predetermined reference value signal $Z_s$ in order to form a differential error signal dZ. The latter signal is binarized by a trigger $TR_1$ and, through a comparison circuit VS including a switch $S_1$, controls the Z-adjusting motor $M_z$ when the reference value is reached, i.e., when the error signal is less than or equal to zero, it acts to block a positive differential signal $dU_F$. The signal $dU_F$ is derived by comparison of the erosion-spark voltage $U_{Fi}$ as the actual value and a predetermined reference value $U_{Fs}$ and which thus represents the error signal for controlling the spark-voltage and the erosion-gap. Conversely, a diminishing or negative signal $dU_F$ blocks the effect of a positive differential signal dZ since, with switch $S_1$ closed, the Z-adjusting motor $M_Z$ is halted by manual switch $SH_3$ set in position 1, and at values below the reference value the spark-voltage is adjusted. Thus, an adequate erosion-gap is maintained on one hand, but erosion is interrupted whenever a predetermined Z-value is reached.

This provides automatic limiting-value control of the erosive process in accordance with predetermined geometrical limits, i.e., shaping control of the process superimposed over continuous erosion-gap control. The erosion-spark voltage is taken as a measured actual value, and it is compared with a predetermined reference or limiting value which if not reached, indicates a decrease in gap-width which requires correction. Superimposition of the two controls is carried out in such a manner that the more critical of the two error signals has preferred access to the correcting element. Thus, when the error signal of the shaping control assumes zero or negative value (the latter indicating excessive removal of material), the feed is terminated or reversed independently of the error signal of the erosion-gap control which allows some further feed. Conversely, the removal of material continues when the correction increases the erosion-gap. This brings about a progressive increase in the erosion-gap, so that the feed of the electrode and the approach to the reference shaping value can continue.

As shown in another modification, to be explained hereinafter, the shaping control may also be such that a diminishing or negative error signal not only halts but causes the reversal of the feed-movement. Furthermore, it is generally desirable to maintain at all times, for both control-circuits, the possibility of overriding control of the correcting element, based upon the criterion of minimum or maximum value selection always with preferred correction of the more critical deviation.

For the purposes of controlling the radial feed, switch $SH_1$ is set in either positions 0 or 1, switches $SH_2$ and $SH_3$ are set in position 2, and an additional manual switch $SH_4$ is set in position 1. Depending upon the status of a change-over switch $S_2$, controlled by output signal $dU_F$ of comparison circuit VS binarized in trigger $TR_2$, a radial feed timer $TG_r$ causes the counter $C_r$ to count up or down. The direction of the count depends on whether an increasing or decreasing value is required for radial deflection R of the translatory rotational movement. As long as voltage $U_{Fi}$ is not less than its reference or limit-value $U_{Fs}$ the actual radial value $R_1$ stored in counter $C_R$, increases. To this end the actual value $R_1$ after passing through a digital-analog transducer $DA_R$, is compared with a predetermined reference value $R_S$, and is converted into a corresponding differential signal dR, which holds switch $S_2$ in the upward-counting-direction by means of switch $SH_2$ and trigger $TR_1$ until the actual value reaches it reference value $R_s$. When the reference value is reached or exceeded, the increase in $R_i$ comes to an end, as it also does if the erosion-spark voltage fails to reach its reference value. Radial reference value $R_s$ is adjusted at a transmitter GB which is a component of a first coordinating-function tramsitter AFGa. In this special case, the latter determines the coordination of $R_1$ independently of $Z_i$ which is constant.

With R-control of this kind, the Z-control may be used as a follow up or auxiliary position-control circuit for a special depth-setting of the tool. To this end switch $SH_1$ is set to position 1 and, through an additional contact K on switch $SH_3$ the signal dZ acts on the input of $A_1$ through switch $SH_1$. This adjusts $Z_i$ to a predeterminable reference value Zs.

Combined Z and R feed-control is effected first of all by second coordinating-function transmitter ZFGb. To this end, switch $SH_4$ is set to position 1, while switch $SH_2$ remains in position 2 and switch $SH_1$ is set to position 0. Counter $C_R$ is then energized, through ZFGb with its adjustable function-generator FGb and multiplier MA factor-controlled thereby, by suitably modified Zi values, so that $R_i$ varies as a predetermined function of $Z_i$, e.g. in a fixed ratio. Control is again effected by use of reference value $R_s$ which then simultaneously represents a Z reference value. The first drive-unit controlled by $RG_Z$ and $M_z$ now acts as the adjusting element as before, in superimposition with the erosion-gap-voltage control.

With switch $SH_1$ in position 2, and by means of differential signal dZ, through a further trigger $TR_3$, R-counter $C_R$ can be held at the zero setting, until a predetrmined Z reference value is reached, by acting upon a reset or blocking input RS. This is followed by the previously explained combined R and Z feed-control with oblique erosion progress of the erosion process. Thus erosion may be effected to a specific depth either only axially or also obliquely. The same may be achieved by pre-setting counter $C_R$ in the opposite direction at a separate input VE, in which case a preliminary adjustment corresponding to a specific axial setting must pass through before the $R_i$ increase comes into effect.

As soon as the R reference value is reached, $C_R$ is reset by a reset signal R supplied by a counter $C_{Po}$ which reaches the reset-input RS of $C_R$ through a manual switch $SH_8$ which must be closed in this case. To this end, $C_{Po}$ is preadjusted to a predetermined angle of rotation $P_o$ by an adjusting signal $r_o$, whence counting takes place downwardly to zero to generate a reset signal r. This angle of rotation determines a minimum period during which a predetermined low limit-value $dR_G$ of the radial reference-value/actual-value difference or a corresponding limit-value $dU_{FG}$ of the spark-voltage reference value/actual-value difference as a reset condition for $C_R$ cannot be reached. Depending upon the particular application, either criterion may be used as a value for initiating a new oblique-erosion cycle. The choice is effected by a manual switch $SH_5$. Adusting signal $r_o$ is produced accordingly by trigger $TR_4$ which triggers dR and $dU_F$ through a differential amplifier $D_P$. Thus radial counter $C_R$ forms, with the relevant control-elements, a repetition-circuit (designated herein, as a whole, by RPS) for the generation of consecutive oblique-erosion cycles. In the simplest case, the envelope-surface is prismatic or generally cylindrical, the radial dimension being determined by adjustment of $R_s$ at GR in the first coordinating-function transmitter ZFGa.

By actuating an additional manual switch $SH_7$ it is possible to activate first coordinating-function transmitter ZFGa in such a manner as to operate with a radial deflection depending upon $Z_i$ according to an adjustable function. This makes possible adjustment to any desired envelope-surface during periodic oblique erosion cycles. To this end, an additional radial reference-value component $R_{s1}$, independent of the resetting of counter $C_R$, but dependent upon $Z_i$, is introduced into the forming of a reference-value/actual-value error signal dR. This component is produced, as a function of $Z_i$, by a factor-controllable multiplier Ma—in this case a multiplying digital-analog transducer in conjunction with a function-transmitter FGa. Particularly, this makes it possible to produce generally conical shaping of envelope-surfaces, the slope and cone-angle of the periodical oblique-erosion being adjustable independently of the shape of the envelope-surfaces.

Furthermore, there are various ways of controlling angle-of-rotation timer $TG_P$ with a view to altering the angle-of-rotation velocity as a function of radial deflection of the rotary motion and of the erosion-voltage as a measure of the width of the erosion-gap. In the first place, the angle-of-rotation velocity can be reduced to an adjustable value by means of an automatically actuated change-over switch $S_3$ actuated by trigger $TC_4$ if the "reference-value minus actual-value" error signal of the spark-voltage or of the radial deflection fails to reach its limit-value. In addition, a manual switch $SH_6$ provides a changeover to continuous variation of the angular velocity, in this case only as a function of the spark-voltage reference-value/actual-value error signal. Usually, however, both functions come under consideration for continuous control of angular velocity. The purpose of this control is mainly to save machining time, in that regions requiring little or no removal of material are machined more quickly than areas where material still remains to be removed.

Figure 3:
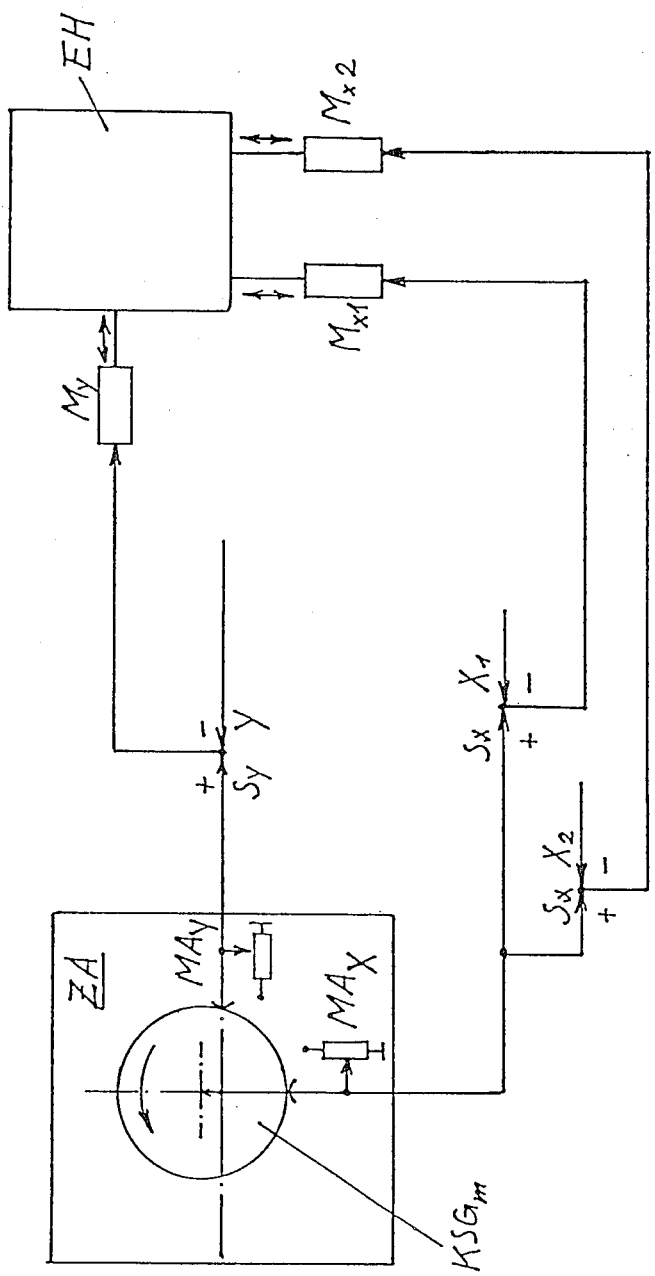
FIG. 3 is a block diagram of another design of a drive-unit with two-dimensional coordinate control for an operating-movement component located in one plane.

FIG. 3 shows a mechanical orbital control-signal generator $KSG_m$ with a rotating eccentric as a phase-angle and radius transmitter within a time-sequence control AZ. Control-signals $S_x$ and $S_y$ are picked up from the eccentric and are transferred to auxiliary control-circuits of the type described hereinbefore. In this case, two adjusting motors $M_{x1}$ and $M_{x2}$, with their own measuring elements of actual values $X_1$ and $X_2$, are provided for the X-components of the rotary motion, so that other means of guidance of the electrode-holder, and means for preventing it from turning, may possibly be unnecessary provided that $M_{x1}$ and $M_{x2}$ act in synchromism.

Figure 4:
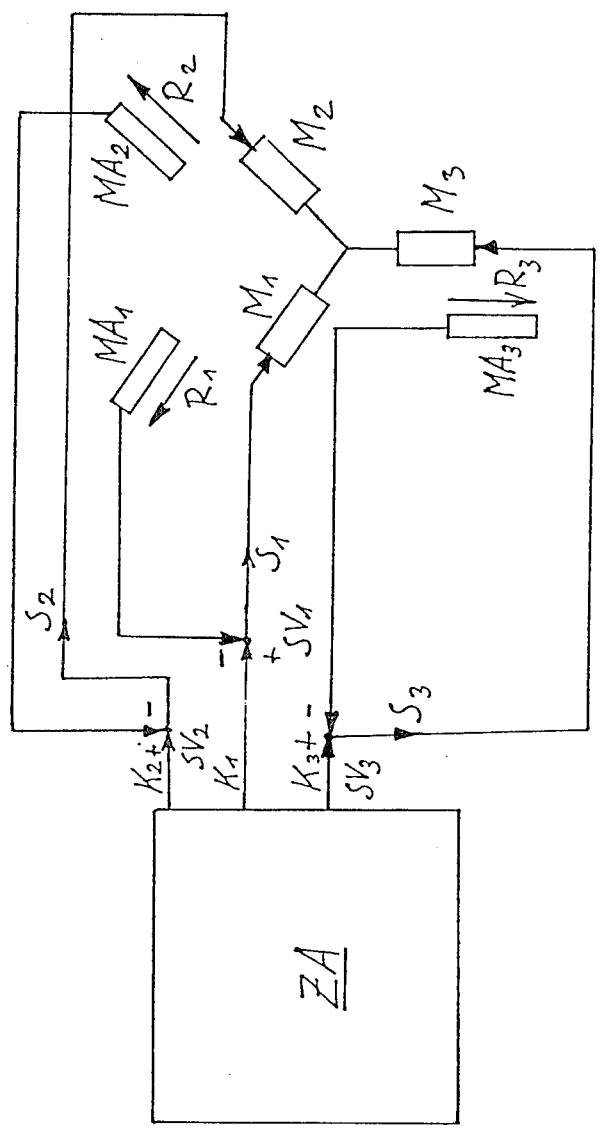
FIG. 4 is a block diagram of a drive-unit having three-dimensional coordinate control for spatial operating movements.

In the embodiment of FIG. 4 rotary motion is produced by linear movement in three coordinate directions $R_1$, $R_2$, $R_3$ equally spaced through 360° by corresponding adjusting motors $M_1$, $M_2$, $M_3$. Auxiliary control-circuits generate control-signals $S_1$, $S_2$, $S_3$ for the adjusting motors as a function of output signals from corresponding reference-value/actual-value comparators $SV_1$, $SV_2$, $SV_3$. Reference-value position signals, displaced in relation to each other by a 120° phase shift, are delivered by output channels $K_1$, $K_2$, and $K_3$ to a common time-sequence control ZA. The three-dimensional coordinate system has the advantage of fewer control and adjustment-errors at peak values of individual coordinate signals.

In the modified design of repetition-circuit RPS shown in FIG. 5, consecutive oblique-erosion cycles are initiated by applying to radial counter $C_R$ a comparatively small decrement. These decrements may be kept small in comparison with the relevant starting values of radial deflection $R_i$ which generally correspond to the relevant maximum deflection upon reaching the reference value according to the predetermined shaping- or envelope-surface. This makes it possible to adjust at will the fineness of graduation between consecutive oblique-erosion cycles, thus ensuring increased uniformity and accuracy of the shaping-surface. This is of special significance when working with flat electrodes of little thickness in the Z direction, and when producing conical envelope-surfaces with electrodes, the surfaces of which are not shaped accordingly, since in this case machining takes place mainly along only a narrow peripheral edge of the electrode.

To this end, as shown in the circuit according to FIG. 5, reset signal r activates a suitably dimensioned or adjusted step-counter Ca which delivers a digital signal, coresponding to the relevant decrement, to a subtracting input of a ditigal-radial-summing-element $SD_R$. The output-value from radial counter $C_R$ is passed to the adding input of this summing element. This produces the modification of the radial-deflection actual-value signal, required in resetting, for subsequent shaping-limit control.

In contrast to this, the design of repetition-circuit RPS shown in FIG. 6 provides a chronologically progressive partial resetting of radial counter $C_R$ for introduction of any new oblique-erosion cycles according to reference-value/actual-value approximation of the shaping-limiting control. To this end, a periodical partial-reset signal is fed to the counting-input of counter $C_R$, by a comparatively slow-acting timer $TG_a$, through an OR-gate OR.

In this case, this progressive partial resetting occurs as a function of the approximation of the actual value of the radial feed to the reference value corresponding to the shaping-limiting control. This is achieved through a contact on a change-over switch $S_{1a}$ in a modified comparator-circuit $VS_a$ in the superimposed shaping and erosion-gap control. Comparator-circuit $VS_a$ differs from the embodiment of FIG. 2b mainly by an improved priority circuit in the form of a minimum-value selection for the relevant priority-activation of the error signal (reference-value/actual-value difference) of the shaping control on the one hand, or the erosion-gap control on the other hand. To this end, error signals dR and dZ, on the one hand and $dU_F$ on the other hand, are fed continuously to a differentiator $D_V$ the bipolar analog-output signal from which is binarized in a trigger $TR_V$ and thus controls the above-mentioned change-over switch $S_{1a}$. The result of this, as may easily be demonstrated, is a minimum-value selection of error signals with constantly maintained access to the actual minimum value, as they approach or fail to reach the critical reference-value/actual-value. If the reference value is approached with increasing radial deflection, this indicates that the difference "reference value minus actual value" is zero or negative. Similarly, a negative "reference-value minus actual value" for the erosion-voltage indicates that the electrode is too close to the workpiece and must therefore be withdrawn on a priority basis. In the circuit of FIG. 6, moreover, both control-deviations act in a bipolar manner upon the Z-drive, if this has been activated by change-over switch $S_{1a}$ according to minumum-value selection. In the circuit of FIG. 6, trigger $TR_1$ of the circuit of FIG. 2b is eliminated. It may, however, be replaced, if necessary, by a bipolar trigger or an amplifier with varying degrees of amplification for positive and negative input signals. In many cases this permits faster and more accurate shaping-limiting control.

In conclusion it is to be emphasized that the method of operating with consecutive oblique-erosion cycles, possibly even in a simplified form, may be achieved by the relative feed between the electrode and the workpiece in the first and/or second operating direction, i.e., in the Z and R direction using periodically incremented additional component subordinated to the shaping-limiting control. A chronologically variable signal-component of this kind may be introduced directly into the Z-drive, for example.

What is claimed is:

1. Apparatus for electro-erosive machining comprising at least one tool electrode and one workpiece electrode which are arranged to move relative to each other in a first operating direction and in a second operating direction at an angle to said first operating direction, said apparatus comprising driving and controlling means for effecting relative movement of said electrodes in said first and second operating directions, means coordinating operation of said driving and controlling means for effecting movement of said electrodes in said first and second operating directions so as to determine the shaping of multidimensional surfaces to be formed within the workpiece electrode, said coordinating means comprising at least two separate coordinating function transmitters, said coordinating function transmitters being sequentially placed in operative connection with the driving and controlling means, shaping-limiting control means for preferentially placing one of said coordinating function transmitters in operative connection with said driving and controlling devices, a repetition circuit for sequentially placing said coordinating function transmitters in control, said repetition circuit being adapted to be activated by said shaping-limiting control means and comprising resettable storing means for storing a value indicative of the actual position of the tool electrode in one operating direction, said resettable storing means including means for resetting said storing means independently of movement in the other operating direction when a predetermined position is reached, means for measuring the width of the erosion gap between the electrodes, means for establishing a reference value indicative of the desired size of the erosion gap and for comparing the reference value with the actual erosion gap width to provide a first error signal, means for producing a second error signal by comparing the electrode displacement resulting from one or both of said operating movements with a reference displacement, and means for superimposing said first and second error signals so that a selected one of said error signal exercises overriding control of the operating movement or movements which result in electrode displacement.

2. An apparatus for electroerosive machining of a workpiece, comprising:
at least one electrode tool and an electrode workpiece;
first driving means connected to said at least one electrode tool or to said electrode workpiece to effect a relative displacement of said electrodes in a first operating direction, second driving means connected to said at least one electrode tool or to said electrode workpiece to effect a relative displacement of said electrodes in a second operating direction, said second operating direction being angularly disposed with respect to said first operating direction;

first and second control means connected to said first and second driving means and coordinating means connected to said first and second control means to coordinate the operation of said first and second control means for effecting relative movement of said electrodes in said first and said second operating directions so as to determine the shaping of multi-dimensional surfaces to be formed within the workpiece;

said coordinating means comprising at least two independent function generators operatively connected to said first and second control means, respectively, and further being connected to third control means, for sequentially being put into operation;

shaping limiting control means connected to said two function generators to preferentially operate one of said two function generators;

means for measuring the width of the erosion gap between the electrodes;

means for establishing a reference value of the erosion gap width and comparing it with the actual erosion gap width to provide a first error signal;

means for producing a second error signal by comparing the electrode displacement resulting from one or both of said operating movements with a reference displacement; and, means for controlling one of said control means in accordance with one of said error signals and for halting the associated driving means when the other of said error signals passes beyond an acceptable limit.

3. An apparatus for electroerosive machining of a workpiece, comprising:

at least one electrode tool and an electrode workpiece;

first driving means connected to said at least one electrode tool or to said electrode workpiece to effect a relative displacement of said electrodes in a first operating direction:

second driving means connected to said at least one electrode tool or to said electrode workpiece to effect a relative displacement of said electrodes in a second operating direction, said second operating direction being angularly disposed with respect to said first operating direction;

first and second control means connected to said first and second driving means;

coordinating means connected to said first and second control means to coordinate the operation of said first and second control means for effecting relative movement of said electrodes in said first and said second operating directions so as to determine the shaping of multi-dimensional surfaces to be formed within the workpiece, said coordinating means comprising at least two independent function generators operatively connected to said first and second control means, respectively, for each controlling movement in one operating direction as a function of movement in another direction, and third control means for sequentially putting said two independent function generators into operation;

shaping limiting control means connected to said two function generators to perferentially operate one of said two function generators; and, wherein said shaping-limiting control means comprises means for measuring an actual value related to said machining of said workpiece, a repetition control circuit operative upon activation to reset at least one of said first and second function generators and thereby cause said apparatus to substantially repeat a previous step in the machining process, and a comparator circuit for comparing a reference value and said actual value measured by said measuring means and for activating said repetition control circuit in response to said comparison.

4. An apparatus according to claim 3, further comprising an erosion gap width control means connected to said shaping-limiting control means, and wherein said repetition circuit is adapted to be activated as a function of the difference between a reference value and the actual value of the erosion gap width.

* * * * *